United States Patent
Dorfman et al.

[15] 3,669,941
[45] *June 13, 1972

[54] POLYTRIAZAPENTADIENE POLYMERS

[72] Inventors: Edwin Dorfman, Grand Island; William E. Emerson, both of Grand Island; Claude T. Bean, Jr., Niagara Falls; Russell L. K. Carr, Grand Island, all of N.Y.

[73] Assignee: Hooker Chemical Corporation, Niagara Falls, N.Y.

[*] Notice: The portion of the term of this patent subsequent to Jan. 13, 1987, has been disclaimed.

[22] Filed: Sept. 23, 1969

[21] Appl. No.: 860,413

Related U.S. Application Data

[63] Continuation-in-part of Ser. No. 533,418, March 11, 1966, Pat. No. 3,489,727.

[52] U.S. Cl..............260/78.4 N, 117/128.4, 117/161 UA, 252/51, 260/2 EN, 260/29.1 R, 260/63 N, 260/79, 260/823
[51] Int. Cl.......................................................C08g 33/06
[58] Field of Search..................260/78.4 N, 2, 63, 79, 248, 260/290, 293, 307, 308, 310, 345.1, 564, 823

[56] References Cited

UNITED STATES PATENTS

| | | | |
|---|---|---|---|
| 3,489,727 | 1/1970 | Dorfman et al. | 260/78.4 |
| 3,317,484 | 5/1967 | Fritz et al. | 260/78.4 |
| 3,369,002 | 2/1968 | Griffin | 260/78.4 |

Primary Examiner—Joseph L. Schofer
Assistant Examiner—John Kight, III
Attorney—Peter F. Casella, Donald C. Studley, Richard P. Mueller, James F. Mudd and Edward A. Meilman

[57] ABSTRACT

This invention relates to triazapentadiene polymers having at least one triazapentadiene unit of the formula:

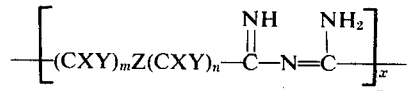

wherein each X is selected from chlorine and fluorine, each Y is selected from halogen and perhalo lower alkyl, $m$ and $n$ are positive integers greater than zero, $x$ is from 3 to 1 million, $-(CXY)_mZ(CXY)_n-$ is a divalent polyhalo organic radical where the sum of $m$ plus $n$ plus the number of equivalent units in Z is at least 4 and Z is at least one member of the group of perhalo lower alkylene, perhalo lower alkylidene, omega-hydroperhalo lower alkylidene, keto, oxy, thio, sulfoxide, sulfone,

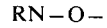

wherein R is selected from perhalo lower alkyl and omegahydroperhalo lower alkyl, polyperfluorooxyalkylene where each alkylene unit has from two to ten carbon atoms and the units are from 2 to 35 in number, poly(perfluoroalkylene dioxy) where each alkylene unit has from two to ten carbon atoms and the units are from 2 to 35 in number, perfluoroalkylene dioxy, perhalo lower alkylamino, perhalocyclopentylene, perhalocyclohexylene, perhalopyridinediyl, perhalopyrazolidinediyl, perhalopyranylene, perhalopiperidylene, perhalophenylene, perhalonaphthalenediyl, perhalodicalinylene, oxadiazolylene, triazolylene, triazinylene, and aryl perhalo lower alkylene wherein substituents on the said aryl group are selected from hydrogen, lower alkenyl, chloro, fluoro, lower alkoxy, nitro, nitroso, cyano, and alkoxy carbonyl; and terminal groups individually selected from the group consisting of nitrile, amidine, $-(CXY)_mZ(CXY)_nCN$, alkyl imidates, thioalkyl esters, thioaryl esters, thiolalkyl esters, thiolaromatic esters, alkyl, omega-hydroperhaloalkyl, perhaloalkyl, perhaloalkene, perhaloalkyne, aryl, lower alkyl ester, aryl ester, carbourea, and perhalo lower alkyl amidine.

18 Claims, No Drawings

POLYTRIAZAPENTADIENE POLYMERS

REFERENCE TO PRIOR APPLICATION

This is a continuation-in-part of application Ser. No. 533,418, filed Mar. 11, 1966 and now U.S. Pat. No. 3,489,727, issued Jan. 13, 1970.

This invention relates to new and useful halogenated polymers and especially to fluorinated polymers containing triazapentadiene groups in the chain.

The triazapentadiene polymers of this invention have at least one triazapentadiene unit of the following general formula:

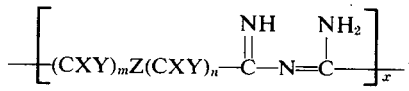

wherein the X's are halogens selected from chlorine and fluorine, and the Y's are selected from halogen and perhalo lower alkyl; $m$ and $n$ are positive integers greater than zero; $x$ is from 1 to 1 million; $-(CXY)_mZ(CXY)_n-$ is a divalent polyhalo organic radical where the sum of $m$ plus $n$ plus the number of equivalent units in Z is at least four, and Z is a difunctional group defined below.

An object of this invention is to provide new halogenated polymers containing triazapentadiene groups in the polymeric chain.

It is another object of this invention to provide a process for the production of liquid low molecular weight polymers.

It is another object of this invention to provide a process for the production of solid polymers in contrast to liquid, low-molecular weight polymers.

Another object of this invention is to provide high molecular weight linear or essentially linear polymers which are soluble in organic solvents and which can be converted to linear or essentially linear soluble triazine polymers.

Another object is to provide new and useful solutions of high molecular weight polymers.

Various other objects and advantages of the present invention will become apparent to those skilled in the art from the accompanying description and disclosure.

According to the present invention the polytriazapentadiene polymer is formed by an addition type of reaction between halogen-containing organic dinitrile compounds and ammonia and/or diamidine compounds. This is illustrated by the following equations:

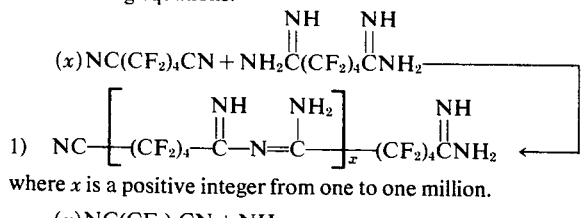

where $x$ is a positive integer from one to one million.

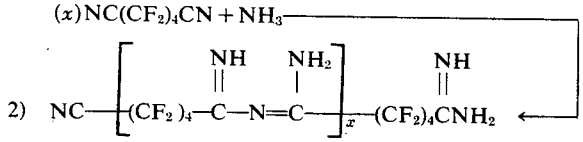

wherein $x$ is an integer from 1 to 1 million.

The haloalkylene groups, illustrated in equations (1) and (2) by perfluorobutylene groups in both the dinitrile and the diamidine starting materials, respectively, to be used in this invention, include alkylene groups having at least 4 carbon atoms in which the carbon atoms alpha ($\alpha$) to the nitrile or amidine radical is perhalogenated and the carbon atom beta ($\alpha$) to the nitrile or amidine radical is at least partially halogenated. The halogens are selected from the group consisting of fluorine, chlorine and mixtures thereof. Perfluoroalkylene groups are preferred, that is, an alkylene radical wherein all the hydrogen atoms have been replaced by fluorine atoms. In addition to perhaloalkylene groups, included within the scope of this invention are difunctional polyhalo organic radicals defined by the formula: $-(CXY)_mZ(CXY)_n-$, wherein the X's in any (CXY) group are halogens, the Y's in any (CXY) group are selected from halogen and perhalo lower alkyl, $m$ and $n$ are positive integers greater than zero, and the sum of $m$ plus $n$ plus the number of equivalent units in Z is at least 4, and Z is selected from perhalo lower alkylene, perhalo lower alkylidene, omega-hydroperhalo lower alkylidene, keto, oxy, thio, sulfoxide, sulfone, polyperfluorooxyalkylene where each alkylene unit has from two to 10 carbon atoms and the units are from 2 to 35 in number, poly(perfluoroalkylenedioxy) where each alkylene unit has from two to 10 carbon atoms and the units are from 2 to 35 in number, perfluoroalkylenedioxy, perhalo lower alkylamino, perhalocyclopentylene, perhalocyclohexylene, perhalopyridenediyl, perhalopyrazolidinediyl, perhalopyranylene, perhalopiperidylene, perhalophenylene, perhalonaphthalenediyl, perhalodecalinylene, oxadiazolylene, triazolylene, triazinylene and aryl perhalo lower alkylene wherein substituents on the said aryl group are selected from hydrogen, lower alkenyl, chloro, fluoro, lower alkoxy, nitro, nitroso, cyano, and alkoxy carbonyl. The halogens represented by the X's and Y's can be the same or different halogens selected from the group consisting of chlorine, fluorine, and mixtures thereof. The above "lower alkyl" groups have from one to 10 carbon atoms in them. The above-defined divalent polyhalo organic radical in the dinitrile starting material can be the same as, or different from, the above-defined divalent polyhalo organic radical in the diamidine starting material. Throughout this disclosure wherever "-halogen" is referred to, it is intended to be those halogens selected from the group consisting of chlorine and fluorine.

Among the alkylene groups included within the scope of this invention are perfluoro lower alkylene, such as perfluorobutylene, perfluoropentamethylene and perfluorohexamethylene, branched chain alkylene groups, such as perfluoroethylbutylene, perfluoromethylhexamethylene, perfluorobutyldodecamethylene, phenylperfluorohexamethylene, substituted phenylperfluorohexamethylene where the substituents are selected from the chloro-, fluoro-, nitro-, nitroso-, nitrile, alkoxy, carbalkoxy, vinyl and styryl. A preferred alkylene group is perfluoro lower alkyl tetramethylene group, especially the perfluoroethyltetramethylene group. The alkylene chain length can be from four to 45 carbon atoms in length, with four to 22 carbon atoms being an intermediate preferred length, while chains of from four to 10 carbon atoms are the most preferred.

Another preferred divalent polyhalo organic radical is a polyperfluorooxyalkylene where each alkylene unit has from two to 10 carbon atoms and the units are from 2 to 35 in number.

The term "triazapentadiene," as used throughout the specification and claims, refers to a divalent radical of the formula:

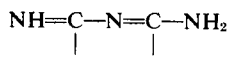

Conveniently, a perhaloalkylene dinitrile in a solvent is stirred, and finely divided perhaloalkylene diamidine is added to it continuously or intermittently as the reaction proceeds, until the desired degree of polymerization is obtained. The molecular weight can be controlled to give a polymer of at least 3 monomer units. Thus, it can be controlled to give a polymer of 3, 5, 10, 100 or 3,000 monomer units. Still higher molecular weight polymers can also be obtained. Preferably, the number of monomer units is about 4 to about 3,000 units.

It is preferred to use pure or substantially pure starting materials in order to reduce the amount of chain termination.

The triazapentadiene polymers formed by reaction of these dinitriles with ammonia and/or diamidines will normally be terminated by nitrile or amidine groups. The presence of impurities in either the dinitrile, diamidine, diluent or equipment or the special nature of the manufacturing process causes the terminal groups on the triazapentadiene polymer to have other groups which may not participate in a polymerization reaction with a nitrile group or ammonia, or an amidine group. Thus, if the dinitrile contains perhaloalkyl nitrile, or omega-hydroperhaloalkylnitrile, the polymers are terminated, to some extent at least, with perhalo-alkyl or omega-hydroperhaloalkyl groups. If the dinitrile contains ester or amide functions, then terminal groups include the corresponding ester or amide groups respectively.

Other terminal groups are embraced, such as, alkyl imidates, thioalkyl esters, thioaryl esters, thiolalkyl esters, thiolaromatic esters, alkyl groups, omega-hydroperfluoroalkyl groups, perhaloalkyl groups, perhaloalkene groups, perhaloalkyne groups, aryl groups such as phenyl, tolyl, nitrophenyl, chlorophenyl, methoxyphenyl, acetaminophenyl, and dimethylaminophenyl, lower alkyl ester groups, aryl ester groups, carbourea

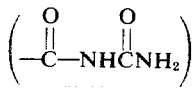

groups, and perhalo lower alkyl amidine

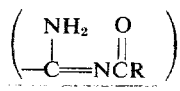

groups where R is selected from perhalo lower alkyl and omega-hydroperfluoro lower alkyl. These end groups would normally be derived to a substantial extent from the starting materials, including the impurities present.

Polymer branching can be introduced at the triazapentadiene group by the presence of of an acylating compound which also contains a nitrile group. Thus, chlorocarbonylperhaloalkyl cyanides, which may be present in the dinitrile being used would acylate a triazapentadiene group, and cause growth of a polymer branch from the pendant nitrile group.

Other compounds which cause branching are nitrile carboxylic anhydrides, nitrile-dinitrophenyl esters, nitrile-sulfonic anhydrides, nitrile-phosphoric anhydrides, nitrile-carboxylic acid bromides, fluorides, and iodides, nitrile isocyanates, nitrile-carbodiimides, and the like. Very active dinitriles, such as perfluoromalononitrile, perfluorosuccinonitrile, and perfluoroglutaronitrile, could also react at a triazapentadiene group and initiate chain-branching.

It has been discovered that polymeric chains having nitrile terminal groups react with other polymeric chains having amidine terminal groups to give polymeric chains of higher molecular weight. It has also been discovered that the perhaloalkylene radical of the nitriles or amidines used need not be alike in all reacting species. Thus, for example, one particular perfluoroalkylene dinitrile may be reacted with a diamidine prepared from a different perfluoroalkylene dinitrile to give a copolymer. The process can also be effected with yet a third dinitrile or diamidine having yet a different type of perfluoroalkylene group to give a terpolymer, and so on, providing the proper dinitrile-diamidine stoichiometry is maintained.

In addition, low molecular weight polymers containing one kind of perhaloalkylene radical in the chain can be reacted with other low molecular weight polymers containing a different type of perhaloalkylene radical in the chain to give block polymers which are different from those described above.

Polymers in which the difunctional polyhalo organic triazapentadiene radicals are distributed in random order are obtained by reaction of mixtures of dinitriles with a diamidine or a mixture of diamidine in a molar ratio approaching 1:1.

A similar polymer is obtained by treating reaction of a mixture of dinitriles with ammonia in a molar ratio approaching 1:1. Co-monomers in addition to the above defined dinitriles may be used with the above defined dinitriles and diamidines.

Thus, a number of different polymers can be prepared in which the type of perhaloalkylene radicals can be connected in the chains in repeating, alternating, or in random order, or in blocks of like radicals, depending on the nature of the reacting species and the order in which they are permitted to react and, again, providing the proper dinitrile-diamidine and/or dinitrile ammonia stoichiometry be maintained.

The dinitriles employed in this invention are perfluoroadiponitrile, perfluorosuberonitrile, and perfluorosebaconitrile. Other dinitriles may also be used where the perhaloalkylene group numbers from four to 45 per halomethylene units. The higher homologous dinitriles or their precursors can be prepared from intermediates which, in turn, can be prepared by known telomerization reaction procedures. The various longer chain materials are desirable because they permit the synthesis of block polymers having desirable properties in the ultimate triazine polymer over a wide temperature range. Such dinitriles include perfluoroadiponitrile, perfluorosuberonitrile, perfluoropimelonitrile, perfluoroazelanitrile, perfluorosebaconitrile, perfluorododecanedinitrile, perfluorooctadecanedinitrile, perfluorotetracosanedinitrile, perfluorotriacontanedinitrile, perfluorotetracontanedinitrile, and the like.

Since maintenance of desirable properties over a wide range of temperatures in the end-product triazine polymer is desired, the use of oxa-perfluoroalkylenedinitriles and branched perfluoroalkylenedinitriles which are otherwise very similar to perfluoroalkylenedinitriles are desirable for the polymer synthesis. Such dinitriles include 3-oxa-perfluorosebaconitrile 5,9-dioxa-perfluorotetradecanedinitrile, oxa-perfluoropimelonitrile oxaperfluoroadiponitrile, tetraoxa-perfluorotetracosanedinitrile, and pentaoxa-perfluorotriacontanedinitrile.

Branched perfluoroalkylenedinitriles, including perfluoro-3-ethyladiponitrile, perfluoro-2-ethyladiponitrile, perfluoro-3-propyladiponitrile, perfluoro-3-methylpimelonitrile, perfluoro-4-ethylpimelonitrile, perfluoro-3-methylsuberonitrile, perfluoro-4-propylsuberonitrile, perfluoro-4-methylazelaonitrile, perfluoro-5-butylsebaconitrile, 2,10-bis(trifluoromethyl)-3,9-dioxaundecanedinitrile, 2,11-bis(trifluoromethyl)-3,10-dioxadodecanedinitrile, perfluoro-2-ethyl-3-methyladiponitrile, perfluoro-3,5-dimethylsuberonitrile, perfluoro-3,6-diethylsebaconitrile and perfluoro-3,6-diethyl-9,13-dimethyloctadecanedioicnitrile are embraced within the starting materials of this invention.

The diamidines employed in this invention are those derived from the above dinitriles and the like. The diamidines are derived from the reaction of the corresponding dinitrile with ammonia, boiling out the excess ammonia, leaving the diamidine behind.

Among the specific triazapentadiene compounds or polymers embraced within the scope of this invention are: bis(4-cyanoperfluorobutyl)triazapentadiene, bis(8-cyanoperfluorooctyl)triazapentadiene, bis(5-cyano-oxa-perfluoroamyl)triazapentadiene, poly(perfluorohexamethylenetriazapentadiene,) poly(perfluorotetramethylenetriazapentadiene), poly(perfluoropentamethylenetriazapentadiene), poly(perfluorohexamethylenetriazapentadiene), poly(perfluoroheptamethylenetriazapentadiene), poly(perflurooctamethylenetriazapentadiene), poly(perfluorodecamethylenetriazapentadiene), poly(perfluoroundecamethylenetriazapentadiene), poly(perfluorododecamethylenetriazapentadiene), poly(perfluorotridecamethylenetriazapentadiene), poly(perfluorotetradecamethylenetriazapentadiene), poly(perfluorotetramethyleneperfluorohexamethylenetriazapentadiene), poly(perfluorotetramethyleneperfluorooctamethylenetriazapentadiene). The block terpolymer: poly(perfluorohexamethyleneperfluorododecamethyleneperfluorooctadecamethyleneperfluorotetracosmethylene)triazapentadiene, poly(dioxa-perfluorooctamethylene)triazapentadiene, and poly(oxa-perfluoropentamethyleneperfluorotetradecamethylene)triaza-pentadiene.

It has been found these dinitriles react to form diamidines when treated with ammonia. To some extent perfluoroadiponitrile forms the cyclo perfluoroadiprimidine when treated with ammonia, but since this reacts with perfluoroalkyl nitriles more slowly than diamidines, and since it can be removed from perfluoroadipamidine, linear polymers can be made from it by the processes of this invention. Perfluoroglutaronitrile, perfluorosuccinonitrile and difluoromalononitrile do not give stable diamidines when treated with ammonia, and therefore have limited use in synthesizing linear polymers.

The polymerization process of this invention may be carried out between about minus 80° and 120° C., but is conveniently carried out at ambient temperature, i.e., room temperature. Since heat is evolved by the reaction, cooling is desirable to avoid the possibility of vaporization of the dinitrile and reaction occurring out of the liquid reaction zone. At temperatures above about 120° C., the diamidine tends to become unstable and decomposes. At temperatures below minus 80° C., the reaction may become sluggish. The preferred temperature range is between minus 30° and 70° C.

The reaction is controlled more easily if carried out in the presence of a diluent, inert under the conditions of reaction, but no diluent is necessary. Suitable diluents are 1,2-dimethoxyethane, diethylether, acetonitrile, and tetrahydrofuran. Of these 1,2-dimethoxyethane is the preferred solvent for high molecular weight perfluoroalkylenetriazapentadiene polymers. Other solvents may be used, such as dioxane, diethylcarbitol, anisole, chloroanisole, dimethoxymethane, dimethylsulfoxide, tert.-butanol, non-halogenated nitriles as a class, such as benzonitrile, succinonitrile, glutaronitrile, and acetonitrile; perhalogenated aliphatic solvents such as perfluorokerosene, tetrachloroethylene, methylene chloride trichlorotrifluoroethane, perfluorotributylamine difluorotetrachloroethane, fluorotrichloromethane, perfluoropyranes, perfluorotetrahydrofurans, and dibromotetrafluoroethane; certain ester solvents such as methylbenzoate, ethyl acetate, and propyl acetate; as well as other diluent solvent means such as dimethylacetamide tertiary amyl alcohol, isopropanol, nitromethane, hexafluoroxylene, benzotrifluoride, chlorobenzene, dichlorobenzene, benzene, toluene, xylene, hexane, heptane, octanes, mineral spirits, αpinene, turpentine, and the like.

It is often advantageous to add finely divided diamidine compound as a solid or a slurry in an inert liquid to a concentrated solution or mixture of a dinitrile compound in reaction liquid. As the polymer increases in molecular weight and the solution becomes more viscous, additional inert liquid may be added until the desired viscosity and polymer molecular weight is obtained. The progress of the polymerization can be followed by measuring the viscosity and the amount of liquid used. It is preferable to use concentrated solutions since a larger proportion of low molecular weight macrocyclic compounds can be formed in a dilute reaction medium due to intramolecular reaction.

As another special form of the invention, the reaction can be controlled to give a monotriazapentadiene compound, illustrated by the formula:

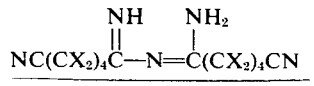

as the major product having two cyanoperhaloalkylene units.

These monotriazapentadiene polymers have the general formula:

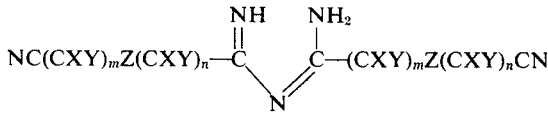

where the divalent group —(CXY$_m$Z(CXY)$_n$— is as defined above.

They are prepared by addition of ammonia to excess dinitrile, removing the unreacted dinitrile, to leave the monotriazapentadienedinitrile. These compounds give fluid bis(cyanoperhaloalkylene) triazines which are useful as such, and which may also be used as intermediates for the production of other polymers.

The reaction can also be carried out by adding ammonia to the concentrated solution or mixture of the dinitrile compound and inert liquid, instead of adding a diamidine. Dilution may be effected as the molecular weight increases. This technique is especially advantageous for making low molecular weight polymers.

Furthermore, the reaction can be carried out by adding the dinitrile in slight excess to a mixture of solid diamidine and inert liquid such as dimethoxyethane. When the low molecular weight polymer formation is complete, further polymerization is carried out by carefully controlled addition of ammonia to the polymer solution until a high molecular weight polymer is obtained.

Another polymerization method may be employed where the diamidine is prepared in situ with dinitrile, solvent, and ammonia with the polymerization vessel. The polymerization process may then be effected by the addition of dinitrile to the diamidine and liquid diluent until a high molecular weight polymer is obtained. The polymerization may also be effected by adding dinitrile in slight excess to the diamidine and higher polymer made by the further addition of small amounts of ammonia.

The novel polymers of the present invention are not thermally stable as such above about 120° C., but when treated as described in copending application Ser. No. 533,430, filed Mar. 11, 1966, they are converted to soluble, thermally stable poly(perhaloalkylenetriazine) polymers, useful as gaskets, seals, sealants, O-rings, bladders, tires, hoses, greases, lubricants, hydraulic fluids, wire insulation and the like.

The following examples will further illustrate the nature of the present invention; however, the invention is not intended to be limited to these examples. Parts are by weight and temperatures in degrees centigrade unless otherwise indicated.

EXAMPLE 1

Preparation of Poly(perfluorotetramethylenetriazapentadiene) followed by conversion to Poly(perfluorotetramethyleneperfluoropropyltriazine)

To perfluoroadipamidine, 0.429 grams, in a 50 milliliter round-bottomed flask containing a magnetic stirrer, was added perfluoroadiponitrile, 0.397 grams, and acetonitrile, 5.5 milliliters. The mixture was stirred and allowed to warm to ambient temperature, 25° C. In 2 hours the mixture was homogeneous. The solution was concentrated to a residue which was dried under vacuum.

The perfluorotetramethylenetriazapentadiene polymer residue had a reduced viscosity of 0.02 at 0.5 grams per deciliter in tetrahydrofuran.

Conversion to triazine polymer with perfluorobutyric anhydride gave poly(perfluorotetramethyleneperfluoropropyltriazine) a viscous grease with a characteristic triazine absorption band at 1,550 cm$^{-1}$.

EXAMPLE 2

Preparation of Poly(perfluorohexamethylenetriazapentadiene) and conversion to Poly(perfluorohexamethyleneperfluoropropyltriazine)

To perfluorosuberamidine, 11.248 grams, and tetrahydrofuran, 30 milliliters, in a 100 milliliter round-bottomed flask at 0° C. was added perfluorosuberonitrile, 10.25 grams, in 75 minutes. The mixture was allowed to warm to room temperature and was stirred for 5 days. A sample was dried under vacuum, and the perfluorohexamethylenetriazapentadiene polymer obtained was found to have an intrinsic viscosity of 0.35 deciliters per gram in tetrahydrofuran, and a molecular weight of 37,000, and had the appearance of a white rubbery gum.

The polymer was converted by reaction with excess perfluorobutyric anhydride to the corresponding triazine polymer which had a molecular weight of 33,000 (about 100 monomer units).

EXAMPLE 3

Preparation of Copolymer Poly(perfluorohexamethyleneperfluorooctamethylenetriazapentadiene)

To 10.5 grams of perfluorosuberonitrile, in 10 milliliters of dimethoxyethane, was added 6.72 grams of perfluorosebacamidine and perfluorosuberamidine (30:70 by weight mixture) in 48 hours with stirring in a nitrogen gas atmosphere at room temperature. Then 5 milliliters of dimethoxyethane were added. In the next 48 hours, 2.39 grams more of perfluorosuberamidine, were added, and 15 milliliters more dimethoxyethane. The temperature was then raised to 50° to 55° C. and perfluorosuberamidine and dimethoxyethane were added in portions intermittently during 18 days until 11.55 grams of amidine and 95 milliliters of dimethoxyethane had been added. The resultant perfluorohexamethyleneperfluorooctamethylenetriazapentadiene copolymer had an intrinsic viscosity in dimethoxyethane of 1.0 deciliters per gram. The molecular weight, determined by membrane osmometry, was 100,000 (about 300 monomer units).

EXAMPLE 4

Preparation of Poly(perfluorohexamethylenetriazapentadiene)

To 23.5 grams of perfluorosuberonitrile and 17 milliliters of 1,2-dimethoxyethane in the nitrogen atmosphere at 0° C., ammonia was added with stirring. When 980 milliliters of ammonia had been consumed, 20 milliliters more of 1,2-dimethoxyethane were added. When 1,100 milliliters of ammonia had been consumed, 22 milliliters of 1,2-dimethoxyethane were added. After 1,320 milliliters of ammonia had been consumed, 10 milliliters more of 1,2-dimethoxyethane were added. When 1,374 milliliters of ammonia had been added, the reaction was considered finished, for the solution was partially gelled. The recovered perfluorohexamethylenetriazapentadiene polymer had an intrinsic viscosity of 0.355 deciliters per gram in 1,2-dimethoxyethane.

A similar reaction gave a poly(perfluorohexamethylenetriazapentadiene) product of intrinsic viscosity 0.13 deciliters per gram in 1,2-dimethoxyethane. Conversion by the process of Example 1, gave a triazine polymer having an intrinsic viscosity of 0.51 deciliters per gram in hexafluoroxylene.

Using the method of Example 4 by substituting perfluorooxapimelonitrile for perfluorosuberonitrile there can be obtained the corresponding poly(perfluorooxapentamethylenetriazapentadiene). By substituting perfluoroethyladiponitrile for perfluorosuberonitrile there can be obtained poly(perfluoroethyltetramethylenetriazapentadiene). By substituting perfluorotetradecane dinitrile for perfluorosuberonitrile there can be obtained poly(perfluorododecamethylenetriazapentadiene).

EXAMPLE 5

Preparation of Poly(perfluorohexamethylenetriazapentadiene)

Perfluorosuberamidine, (1.9740 grams) having a melting point of 188° to 190° C. in 6 milliliters of anhydrous tetrahydrofuran was stirred magnetically in 50 milliliters round bottom flask in an ice bath. To this were added 1.747 grams of perfluorosuberonitrile in 1 minute, and the solution was stirred in ice for 17 hours. Particles of amidine were still observed, so additional nitrile was added until about 12 percent excess over the theoretical amount was consumed. The amidine was then completely dissolved. A sample of the product was removed for analysis. A small band at 4.35 microns in the infrared spectrum of the reaction mixture sample was observed, indicating the presence of excess nitrile groups. The unpurified amidine used may have had some free ammonia. A sample of the solution was dried under vacuum and gave a residue of inelastic film. The solid triazapentadiene polymer had an intrinsic viscosity in tetrahydrofuran of 0.36 deciliters per gram. The number average molecular weight in tetrahydrofuran by membrane osmometry was 37,000 (about 100 monomer units). Differential thermal analysis showed endotherms at 125° C. and 186° C. identified as melting and decomposition respectively in a melting point apparatus.

EXAMPLE 6

Preparation of Poly(perfluorooctamethylenetriazapentadiene)

A round bottom flask was fitted with a gas inlet tube, a gas bubble counter in the inlet line, and a magnetic stirrer. In it a solution of perfluorosebaconitrile, 15 grams and 32 milliliters of tetrahydrofuran was kept saturated with anhydrous ammonia for 2 hours. Condensation products of ammonia and the dinitrile were thereby formed as intermediates, which broke down in the presence of excess ammonia to give perfluorosebacamidine as a white solid which precipitated out, as perfluorosebacamidine. More perfluorosebaconitrile, 15 grams, was then added until the solid perfluorosebacamidine was all consumed, as evidenced by its being dissolved. A sample was removed for analysis. The infrared absorption spectrum showed a nitrile peak at 4.35 microns. Ammonia was then added in small volumes until the nitrile absorption peak disappeared and the solution became viscous. A sample was dried under vacuum, probably incompletely, to give a slightly tacky triazapentadiene polymer of intrinsic viscosity of 0.38 deciliters per gram. The differential thermal analysis (DTA) showed a continuous endotherm to the melting point of 147° C. In a sealed tube the sample started to wet the glass wall at 100° C. with complete fusion at 156° C. An endotherm at 189° C. was associated with a decomposition which was observed in a melting point tube.

EXAMPLE 7

Preparation of Poly(perfluoropropylcyanoperfluoropropylperfluorohexamethylenetriazine) and Vulcanization Thereof A poly(perfluorohexamethylenetriazapentadiene) polymer was prepared by the addition of perfluorosuberamidine to perfluorosuberonitrile in 1,2-dimethoxyethane. A polymer of intrinsic viscosity 0.9 deciliters per gram was obtained. The polymer, in dimethoxyethane solution, 65 grams (13.7 percent by weight of polymer), was added from an additional funnel with stirring to a mixture of perfluorobutyric anhydride, 72 grams, and 4-cyanoperfluorobutyryl chloride, 28 grams, in a closed round-bottomed flask, which was vented occasionally to release hydrogen chloride which was formed as a by-product. The mixture was stirred 30 minutes, then the volatile materials were removed by vacuum distillation to 150° C. at 0.1 millimeters of mercury. A sample of the recovered triazine polymer, 2.5 grams (reduced viscosity, 0.25 at 0.3348 grams per deciliter), was milled with silver oxide, 0.25 grams, and molded at 130° to 160° C. The molded specimen had a tensile strength of 1,030 pounds per square inch at 75 percent elongation and was vulcanized.

The 4-cyanoperfluorobutyryl chloride used in the above example is believed to be a new composition of matter, and separately claimed in Ser. No. 573,195 filed Aug. 18, 1966.

EXAMPLE 8

Preparation of Poly(perfluorotetramethyleneperfluorohexamethylenetriazapentadiene)

To perfluoroadiponitrile, 16.5 grams, and 1,2-dimethoxyethane, milliliters, was added perfluorosuberamidine, 26.3 grams.

The addition was made during 24 hours, and additional dimethoxyethane, 45 milliliters, was added in portions during the reaction. The polymer had an infrared absorption spectrum typical of the triazapentadiene structure.

EXAMPLE 9

Preparation of Poly(perfluorotetramethyleneperfluorohexamethylenetriazine)

The triazadiene polymer of Example 8, 25 grams in dimethyoxyethane, was added with stirring to perfluorobutyric anhydride, 82 grams, in a period of 2 hours at 25° to 30° C. The polymer was recovered by vacuum distillation of the volatile material and vacuum drying of the residue. The polymer recovered had a reduced viscosity of 0.01 grams per deciliter and had infrared absorption at 6.4 microns, characteristic of the triazine group.

As many widely different embodiments of this invention may be made without departing from the spirit and scope thereof, it is to be understood that this invention is not limited to the specific embodiments thereof.

We claim:

1. The triazapentadiene polymer consisting essentially of 3 to 1 million triazapentadiene units of the formula:

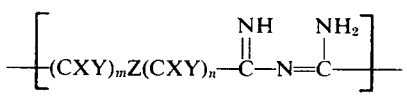

wherein each X is selected from chlorine and fluorine; each Y is selected from halogen and perhalo lower alkyl, $m$ and $n$ are positive integers greater than zero; $-(CXY)_mZ(CXY)_n-$ is a divalent polyhalo organic radical having four to 45 carbon atoms and Z is at least one member of the group of perhalo lower alkylene, perhalo lower alkylidene, omega-hydroperhalo lower alkylidene, keto, oxy, thio, sulfoxide, sulfone,

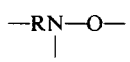

wherein R is selected from perhalo lower alkyl and omega-hydroperhalo lower alkyl, polyperfluorooxyalkylene where each alkylene unit has from two to 10 carbon atoms, poly(perfluoroalkylene dioxy) where each alkylene unit has from two to 10 carbon atoms, perfluoroalkylene dioxy, perhalo lower alkylamino, perhalocyclopentylene, perhalocyclohexylene, perhalopyridinediyl, perhalopyrazolidinediyl, perhalopyranylene, perhalopiperidylene, perhalophenylene, perhalonaphthalenediyl, perhalodecalinylene, oxadiazolylene, triazolylene, triazinylene and aryl perhalo lower alkylene wherein substituents on the said aryl group are selected from hydrogen, lower alkenyl, chloro, fluoro, lower alkoxy, nitro, nitroso, cyano, and alkoxy carbonyl; and terminal groups individually selected from the groups consisting of nitrile, amidine, $-(CXY)_mZ(CXY)_nCN$, alkyl imidates, thioalkyl esters, thioaryl esters, thiolalkyl esters, thiolaromatic esters, alkyl, omega-hydroperfluoroalkyl, perhaloalkyl, perhaloalkene, perhaloalkyne, aryl, lower alkyl ester, aryl ester, carbourea, and perhalo lower alkyl amidine.

2. The triazapentadiene polymer of claim 1 wherein the $-(CXY)_mZ(CXY)_{D)}-$ radical is a perfluoroalkylene group of four to 45 atoms.

3. The triazapentadiene polymer of claim 2 wherein the $-(CXY)_mZ(CXY)_{D)}-$ radical is a perfluoroalkylene group of four to 22 carbon atoms.

4. The triazapentadiene polymer of claim 2 wherein the $-(CXY)_mZ(CXY)_{D)}-$ radical is a perfluorotetramethylene group.

5. The triazapentadiene polymer of claim 2 wherein the $-(CXY)_mZ(CXY)_{D)}-$ radical is a perfluorohexamethylene group.

6. The triazapentadiene polymer of claim 2 wherein the $-(CXY)_mZ(CXY)_{D)}-$ radical is a perfluorooctamethylene group.

7. The triazapentadiene polymer of claim 2 wherein the $-(CXY)_mZ(CXY)_{D)}-$ radical is a perfluorododecamethylene group.

8. The triazapentadiene polymer of claim 2 wherein the $-(CXY)_mZ(CXY)_{D)}-$ radical is a perfluoro lower alkyl tetramethylene group where the said perfluoro lower alkyl group has from one to ten carbon atoms.

9. The triazapentadiene polymer of claim 8 wherein the $-(CXY)_mZ(CXY)_{D)}-$ radical is a perfluoroethyltetramethylene group.

10. The triazapentadiene polymer of Claim 1 wherein the $-(CXY)_mZ(CXY)_{D)}-$ radicals are perfluoroalkylene groups having four to 45 carbon atoms connected by triazapentadiene groups in repeating, alternating or random order.

11. The triazapentadiene polymer of claim 10 wherein the perfluoroalkylene groups are perfluorohexamethylene and perfluorooctamethylene.

12. The triazapentadiene polymer of claim 10 wherein the perfluoroalkylene groups are perfluorotetramethylene and perfluorohexamethylene.

13. The triazapentadiene polymer of claim 10 wherein the perfluoroalkylene groups are perfluorotetramethylene and perfluorooctamethylene.

14. The triazapentadiene polymer consisting essentially of 3 to 1 million triazapentadiene units of the formula

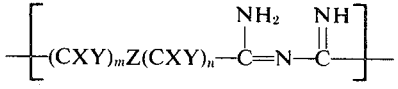

wherein each X is selected from chlorine and fluorine, each Y is selected from halogen and perhalo lower alkyl, m and n are positive integers greater than zero, and $-(CXY)_mZ(CXY)_n$ is a polyperfluorooxyalkylene radical where each alkylene unit has from two to 10 carbon atoms and the units are from 2 to 35 in number.

15. A block polymer in which at least one of the polymeric recurring units is the triazapentadiene polymer of the formula defined in claim 1.

16. The block copolymer of claim 15 wherein the recurring units contain $-(CXY)_mZ(CXY)_n-$ radicals of perfluorotetramethylene and perfluorooctamethylene groups.

17. The triazapentadiene polymer consisting essentially of 3 to 1 million triazapentadiene units of the formula:

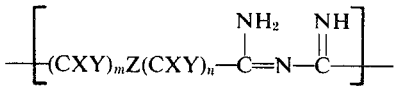

wherein each X and Y is fluorine, Z is oxygen, $m$ and $n$ are positive integers greater than zero, and $-(CXY)_mZ(CXY)_n-$ has four to 45 carbon atoms.

18. The triazapentadiene polymer of claim 17 in which $m$ plus $n$ is 4.

* * * * *